Dec. 11, 1923.
H. L. WEED
1,476,784
ROTARY INTERNAL COMBUSTION ENGINE
Filed Jan. 2, 1920   4 Sheets-Sheet 1
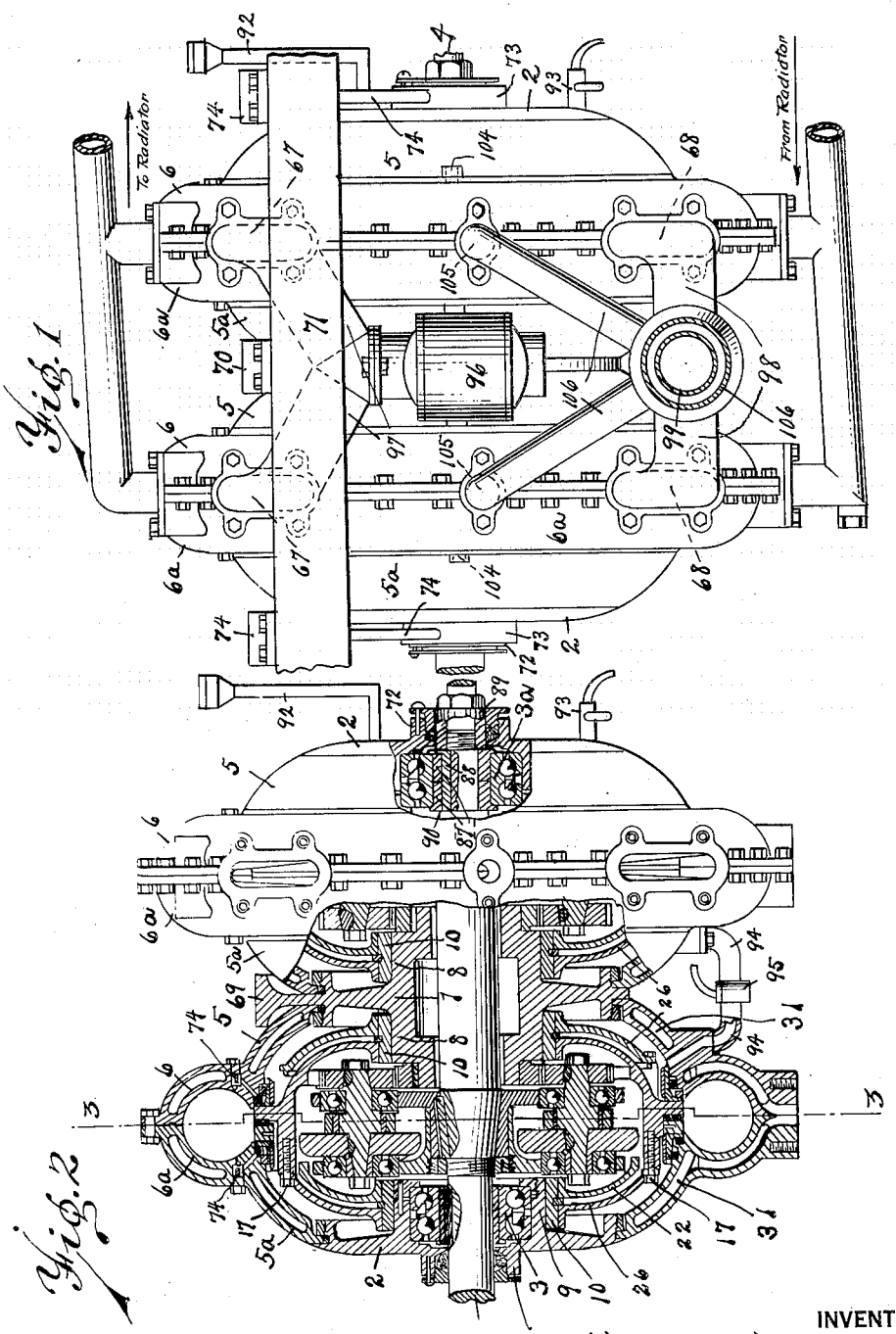
INVENTOR
Howard L. Weed
BY
Edward N. Pagelsen
ATTORNEY Dec. 11, 1923.  
H. L. WEED  
1,476,784  
ROTARY INTERNAL COMBUSTION ENGINE  
Filed Jan. 2, 1920  
4 Sheets-Sheet 2

INVENTOR  
Howard L. Weed  
BY  
Edward N. Pagelsen  
ATTORNEY

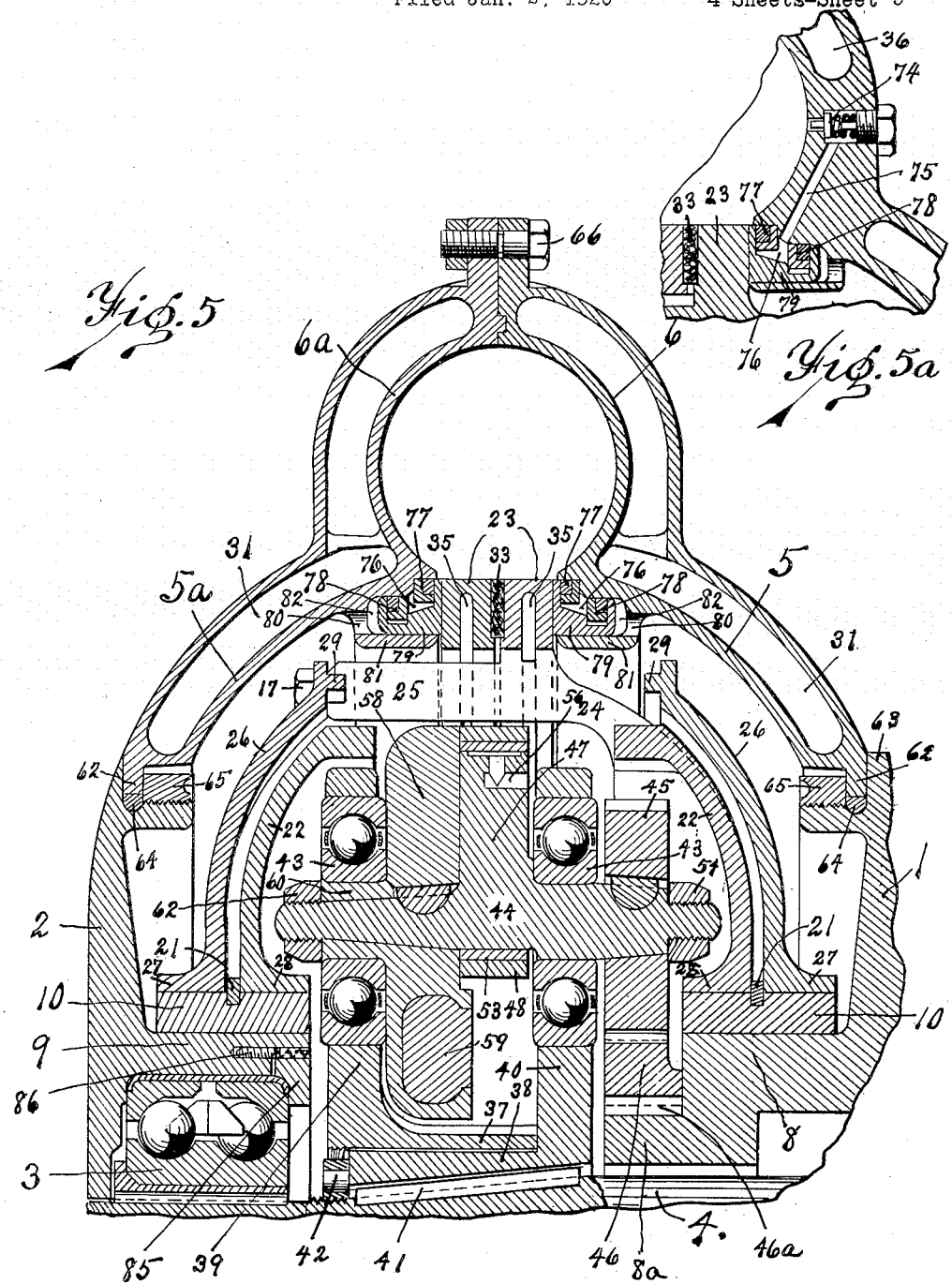

Dec. 11, 1923.
H. L. WEED
ROTARY INTERNAL COMBUSTION ENGINE
Filed Jan. 2, 1920
1,476,784
4 Sheets-Sheet 4
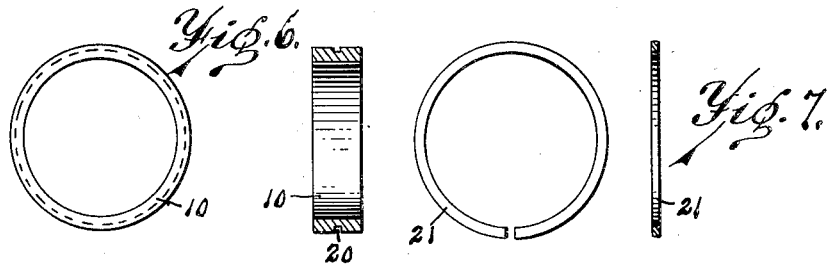
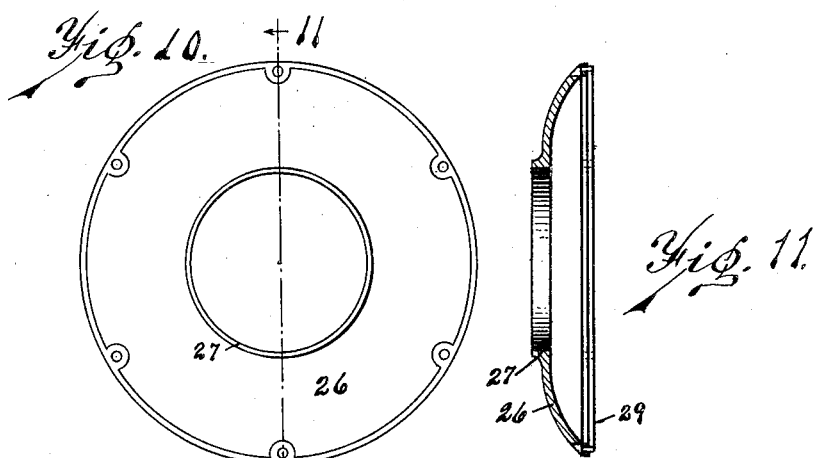
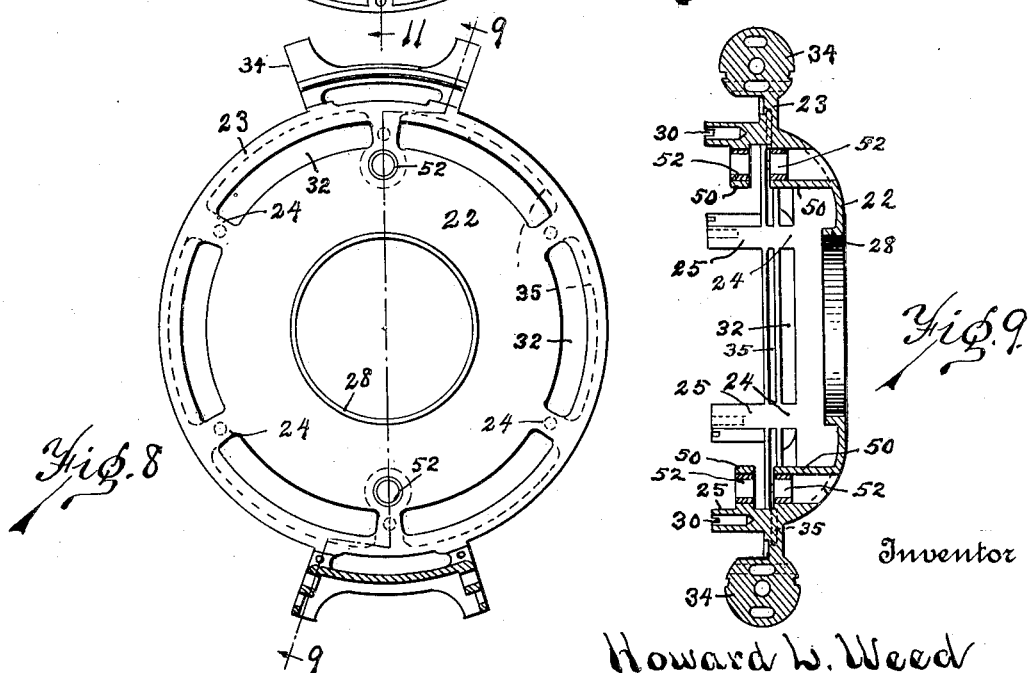

Patented Dec. 11, 1923.

1,476,784

UNITED STATES PATENT OFFICE.

HOWARD L. WEED, OF DETROIT, MICHIGAN, ASSIGNOR TO WEED DIFFERENTIAL-ROTARY MOTOR COMPANY, OF DETROIT, MICHIGAN, A CORPORATION OF SOUTH DAKOTA.

ROTARY INTERNAL-COMBUSTION ENGINE.

Application filed January 2, 1920. Serial No. 348,864.

*To all whom it may concern:*

Be it known that I, HOWARD L. WEED, a citizen of the United States, and residing at Detroit, in the county of Wayne and State of Michigan, have invented a new and Improved Rotary Internal-Combustion Engine, of which the following is a specification.

This invention relates to rotary engines of the alternating piston type, and it consists in part of a rigid support for the rotors, separate and apart from the main shaft.

It further consists in a novel planetary crank shaft for each rotor, a carrier for the crank shafts mounted on the main shaft, and a fly-wheel on each planetary crank shaft, which fly-wheel is properly weighted to counterbalance the crank shaft.

It also consists in the novel construction of the rotors to which the pistons are attached, each of the rotors being formed of a main portion and a follower joined at their outer edges and spaced apart to admit the main portion of the other rotor and the crank shaft carrier being positioned between the two parts of each rotor, each rotor being formed with slots to permit the passage of connecting bars which join the two portions of the other rotor.

It also consists in a packing ring mounted between the adjacent faces of the rims of the rotors and in other packing rings pressing against the outer sides of the rims of the rotors.

It also consists in constructing the engines in pairs connected to a central supporting structure and in mounting an abutment gear on said central support for each engine, pinions being mounted on the adjacent ends of the planetary crank shafts.

It also consists in the details of construction illustrated in the accompanying drawings and particularly pointed out in the claims.

This engine shown in the accompanying drawings is of the same general character as those shown in my patent No. 1,298,839 granted April 1, 1919, and my Patent No. 1,348,675 granted August 3, 1920.

Figure 3:
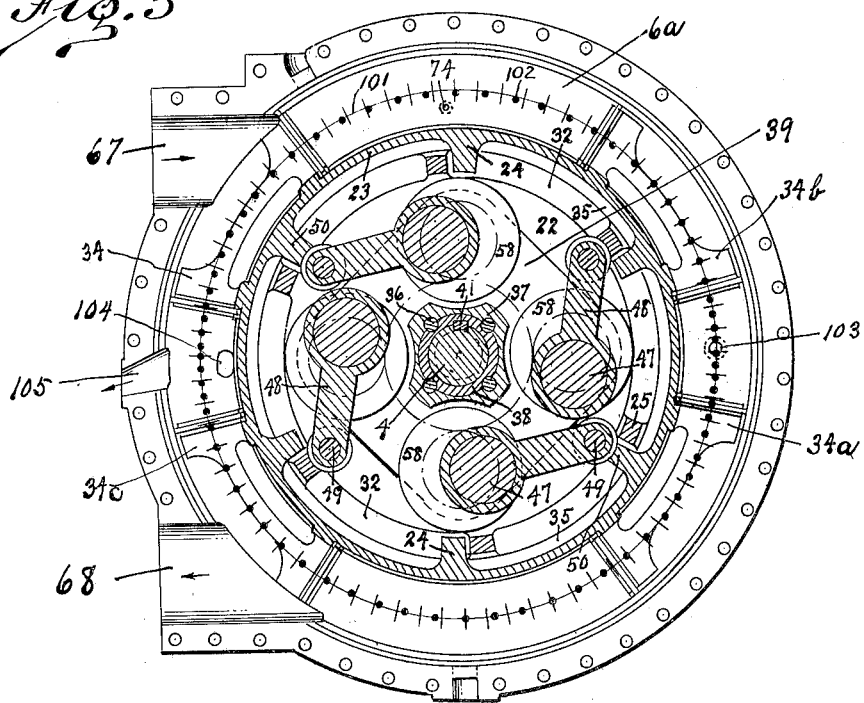
Figure 4:
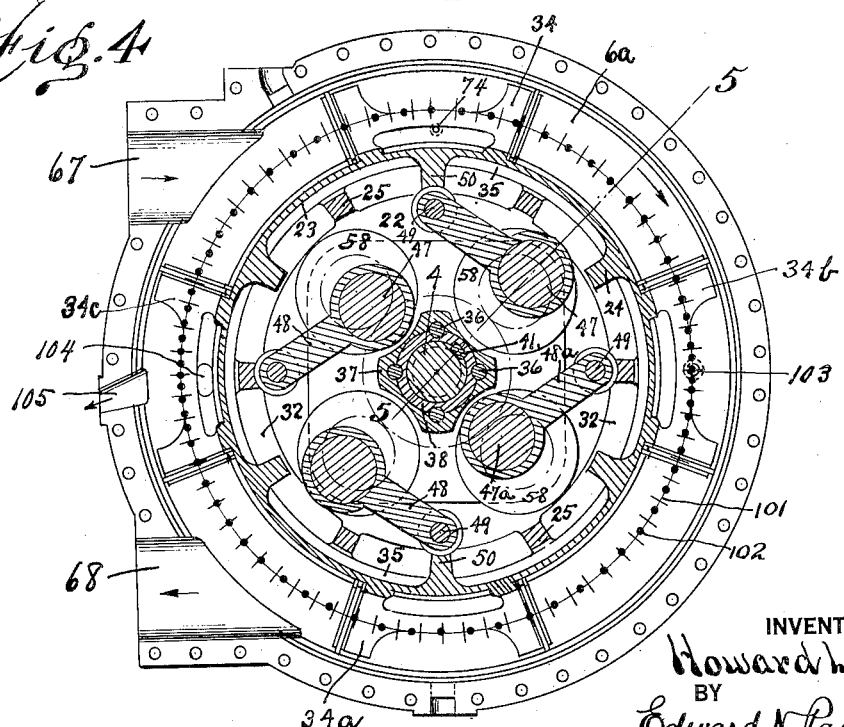

In the accompanying drawings, Fig. 1 is a side elevation of two of these improved engines connected to the same shaft. Fig. 2 is a vertical section of one of these engines and a portion of the other on a plane parallel to that of Fig. 1. Figs. 3 and 4 are sections on the line 3—3 of Fig. 2, showing parts in different positions. Fig. 5 is a section on the line 5—5 of Fig. 4. Fig. 5ª is a section through a check valve. Fig. 6 shows a bearing ring for the rotors. Fig. 7 shows the spacing ring between the bearings of the rotors. Fig. 8 is an elevation of the main portion of a rotor. Fig. 9 is a section on the line 9—9 of Fig. 8. Fig. 10 is an elevation of a rotor follower. Fig. 11 is a section on the line 11—11 of Fig. 10.

Similar reference characters refer to like parts throughout the several views.

As explained in the above named patent and pending application, I prefer to build the present engines in pairs, with the explosions in the one occurring alternately with the explosions in the other, so as to obtain a very uniform pull on the main shaft as well as a continuous intake, a continuous scavenging and a continuous exhaust. In the present case, however, the rotors are not mounted on the main shaft but are carried by the casings, and the main shaft, therefore, may be much lighter as it will not be subject to flexures resulting from the uneven stresses from the rotors. The pair of engines need only have two bearings for the main shaft, even for installations of considerable horse power, and one of these bearings is preferably adapted to prevent endwise movement of the main shaft.

The present structure embodies casings having a central frame 1 and two end hub structures 2. The parts 2 may be provided with ball bearings 3 and 3ª, in which the main shaft 4 is mounted. The bearing 3ª is adapted to prevent the shaft from moving endwise at that end of the structure. As the two engines are substantially identical in construction, only one is shown completely in section in Fig. 2. Connected to the parts 5 and 5ª of the casing are the two parts 6 and 6ª which constitute the water-jacketed annular cylinder whose axis is in a plane at right angles to the main shaft. This casing bulges out to afford room for the parts contained therein.

The frame 1 and the hub structure 2 are provided with internal cylindrical flanges marked 8 and 9 respectively on which bearing rings 10 are loosely mounted so that they may rotate freely, and on, these rings are mounted the rotors. In my patents the rotors are shown carried directly on the main shaft, but in the present case these rotors are mounted on the solid frame of the machine and therefore will transmit nothing but turning stresses to the main shaft. Each rotor is provided with two bearings, one on each bearing ring, and so has an unusually wide base, and all stresses are in radial planes which cross the main shaft between said bearings so that there is no tendency for the rotors to tip from the planes of their rotation. Each rotor is provided with openings through which connecting bars on the other rotor extend so that the necessary relative movement between the rotors may be had.

Within the space enclosed by the rotors and mounted on the shaft is a carrier for the planetary crank shafts, each of which crank shafts connects to one or the other rotor by means of connecting rods and each crank shaft being provided with an independent fly wheel. These planetary crank shafts are preferably mounted in ball bearings carried by the crank shaft carrier, and on the inner end of each crank shaft is mounted a pinion which meshes with a gear secured to the hub of the inner frame. This main gear acts as an abutment, the pinions on the ends of the planetary crank shafts being turned by the connecting rods which attach to the rotors, and therefore by crawling around on this abutment pull the crank shafts with them and thus cause the crank shaft carrier to turn the main shaft.

As explained in my former application and patent, each rotor has a pair of pistons which travel generally in the same direction but which relatively approach and recede from one another. This relative movement is produced by the force of the explosion of the gases which are drawn into the spaces between the pistons on the rotors, are compressed between these pistons, are exploded, and by their expansion force the pistons of the rotors apart, accelerating the movement of one in the direction of their general movement and slowing down the other, the relative movements of the rotors, however, being transmitted to the crank shafts by means of the connecting rods and causing the turning of the pinions, which, co-acting with the main stationary gear, carry the crank shaft carrier around the axis of the main shaft.

The details of these various constructions will now be taken up and particularly pointed out.

As stated before, bearing rings 10 are mounted on the flanges 8 and 9 of the hub structures. Each of these bearing rings has a central groove 20 in which the spacing ring 21 is mounted. This ring is split in order that it may be sprung over the bearing ring 10 and moved into place. Each bearing ring 10 is free for longitudinal movement with the rotors and these in turn are positioned by guiding rings adjacent the rims of the rotors. By thus permitting free longitudinal movement of the bearings of these rotors, perfect action without binding of the packing rings adjacent the pistons is insured. In other words, the rotors and the bearing rings 10 together will float on the flanges 8 and 9 on the hubs.

Referring to Figs. 8 to 11 inclusive, each rotor has an annular web 22 to which is connected a rim 23 by means of the short arms 24. Extending laterally from these arms are a series of posts 25 to which the follower 26 of the rotor is attached by means of bolts 17, shown particularly in Figs. 2 and 5. Each follower 26 has a bearing flange 27 and each rotor has a bearing flange 28 which fit around the bearing rings 10. A circumferential rib 29 is formed on the follower 26 and enters the notches 30 in the post 25 on the main part of the rotor in order to exactly position the two parts of the rotor relative to each other. Each main portion of the rotor is mounted within the space of the other rotor, and each rotor is provided with slots 32 through which the posts 25 of the other rotor extend. In this way the two rotors are mounted independently of each other and ample relative movement between them is permitted by these slots 32. As shown in Fig. 5, the adjacent faces of the rims 23 of the rotors are recessed to receive a packing ring 33, preferably made of ordinary piston ring iron.

The pistons 34, 34$^a$, 34$^b$ and 34$^c$ of the present structure are the same as those shown in my said Patent No. 1,348,675. The rims 23 of the rotors are provided with circular grooves 35 (shown in dotted lines in Fig. 8) which are interrupted by the arms 24. When the rotors are traveling the oil in the casing will be carried up into these grooves by centrifugal force. The oil will also be caused to surge into and out of these grooves as well as back and forth by means of the posts 25 which are traveling back and forth in the slots 32 beneath these grooves and by the variable speed of the rotors. The result is that the rotor rims will be kept sufficiently cool, the heat being transmitted to the casing by the oil and carried off by the water in the passages 31. When the engine is running at high speeds this lubricating oil will be jammed against the flanges 29 on the two followers 26 and force them apart, carrying the rims 23 of the rotors toward each other and pressing them against the packing ring 33.

Mounted on the shaft 1 is a crank shaft carrier consisting of the two telescoping hubs 37 and 38 secured together with pins 36, (Fig. 3), and of the disks 39 and 40. This crank shaft carrier may be secured to the shaft 1 by means of a key 41 and a nut 42. Mounted in the disks 39 and 40 are ball bearings 43 for the two ends of the planetary crank shafts 44. On one end of each planetary crank shaft, by means of a nut 54, is secured a pinion 45 which meshes with a gear 46 secured to the reduced end $8^a$ of the flange 8 on the frame 7 by means of a key $46^a$. The crank pin 47 of each planetary crank shaft is made quite large and on each crank pin is mounted a connecting rod 48 which is pivoted on a pin 49 carried by a post 50 which extends inwardly from each rim 23 of the rotors. As shown in Fig. 9, this post is preferably in two parts, each provided with a bearing sleeve 52 for the pin 49 in order to support the pin on both sides of the connecting rod, thus giving a long bearing and therefore great rigidity. If desired, the opposite end of the connecting rod may be formed with a bearing sleeve 53 as shown in Fig. 5. I prefer to form oil passages 56 in the crank pin to permit lubricant to flow in between the bearing surfaces of the crank pin and the connecting rod, as shown in Fig. 5. Mounted on each crank shaft is a fly-wheel 58 which may be formed of iron and have a socket which is filled with a quantity of lead 59 so as to counterbalance the crank shaft and as far as may be the connecting rod. I prefer to form this fly-wheel 58 with a hub 60 which extends outwardly through the adjacent bearing 42 and this fly-wheel may be held in position on the crank shaft by means of a nut 62.

The operations of this crank shaft carrier, the planetary crank shafts, the connecting rods and the rotors are the same as the corresponding parts in my said Patent No. 1,348,675. The addition of the fly-wheel 58 to each of the planetary crank shafts, however, makes for very easy running as the crank shafts are so well balanced that all jerking is eliminated. Placing the pinions 45 on the same ends of the crank shafts avoids the necessity of providing two abutment gears. As the entire chamber may be filled with lubricant, the parts may run indefinitely with very little wearing. The fly-wheels 58 and the crank shafts 44 are submerged in this lubricant and therefore throw it out with great force. An advantage of the fly-wheels is that they store intermittent impulses of energy and not only turn the crank shafts over their dead centers but also deliver this energy to the crank shaft carrier and main shaft by way of the crank shafts, the pinions thereon and the abutment gear, in a constant, even stream of power. A further effect of the fly-wheels 58 is to keep a constant pressure between the teeth of the pinions 45 and of the abutment gear 46, thus preventing back-lash and obviating the noise and wear incident thereto.

As the pistons approach each other and then separate, and as the turning moments on the pistons vary according to the pressures of the fuel and gases between the pistons, there is a tendency of first one rotor and then the other to stop and even turn backwards. The parts are, however, so proportioned that the rotors must move forward at all times although at varying speeds. By storing the intermittent impulses of energy in these fly-wheels, force is at hand to resist this tendency of the rotors to stop or reverse, and they are thus caused to move smoothly and without jerking, and the wear of the moving parts connected to the rotors is reduced to a minimum.

Referring to Fig. 4, and particularly to piston $34^b$ which is acting as an abutment to resist the pressure of the expanding gas between it and piston $34^a$, it will be noticed that the connecting rod $48^a$ coupled to the crank pin $47^a$ is pulling back on this crank pin. The crank pin, however, is on the inside of its path so that any pull thereon will tend to turn it in the proper direction and thus assist instead of resist the turning moments of the small fly-wheels. The connecting rod just ahead is pushing its crank pin around in the same direction. All stresses on the rotors therefore are transmitted to the crank shafts as turning stresses and always in the same direction of rotation, excepting, of course, at the instants that the crank pins are passing their dead centers. At these times the fly-wheels act to turn the crank shafts.

In Fig. 5, I have shown the means for connecting the flaring portions 5 and $5^a$ of the casing to the central frame 1 and bearing members 2. It will be understood that the hub carrier 2 and the flaring portions $5^a$ connected thereto are last attached to the remainder of the engine. The inner member 5 and the cylinder part 6 of the left hand engine are positioned with the flange 62 resting against the radial portion 63 of the frame 1. At intervals small keys 64 are provided to position the parts 5 and 6 so that the ports will all come in proper position. After this has been done, a locking ring 65 is screwed in to lock the flange 62 firmly against the shoulder 63. Any other means may be employed to secure the parts together, or, if desired, the inner parts 5 and 6 may be made integral with the frame 1, except for a reason to be pointed out later. After the crank shaft carrier, the planetary crank shafts, the connecting rods, and the rotors have been assembled, they are all slipped together into position and the key 41 and nut 42 are employed to secure the crank shaft carrier rigidly to the main shaft. The movable parts may now be turned by hand to observe their action. Thereafter the hub structure 2 and the outer parts $5^a$ and $6^a$ are secured together by means of a similar locking ring 65 and then these portions as a unit are secured to the other portions of the engine casing by means of the screws 66. The other engine is assembled in the same manner.

As shown in Figs. 3 and 4, the cylinder 6 is formed with an intake port 67, an exhaust port 68, and the scavenging ports 104 and 105, the functions of which have been fully described in my said Patent No. 1,348,675. The walls of the ports 67 and 68 are carried out tangentially in order that the machining may be easier. While in Figs. 3 and 4 these passages 67 and 68 extend to the right, the entire structure embodying the cylinder 6—6$^a$ and the flaring parts 5—5$^a$ may be reversed, the counter-shaft carrier and the rotors remaining as shown in Figs. 3, 4 and 5, resulting in the passages 67 and 68 extending toward the right instead of toward the left. In such case the engine will run in the opposite direction with the same efficiency and force as it now produces. The point is that the lead of the connecting rods 48 from the pins 49 is immaterial so far as the rotation of the engine is concerned, but I prefer to have the connecting rods follow the crank pins instead of preceding them.

The central frame of this engine resists the turning force applied to the shaft. I provide the central hub structure 1 on which the abutment gears are mounted and which therefore acts against turning stresses on the shaft with an upward extension 69 which has a cross head 70 bolted at its ends to the supporting beams 71. The central hubs 72 of the end hub structures 2 may extend into sleeves 73 which are supported by means of braces 74 on these same beams 71, but these serve merely as centering devices to steady the engine, as the main stresses are carried by the cross head 70. It will, therefore, be seen that the twisting stresses which normally must be taken up by the cylinders and the parts attached thereto are centered on the hub structure 1 and its support 70 and transmitted to the main supporting beams 71 of the engine.

As fully described in my said Patent No. 1,348,675 and indicated in Fig. 2, and shown in Fig. 5$^a$, small check valves 74 are mounted in the walls of the cylinder 6 and small passages 75 extend from said check valves to the circumferential passages 76 in which gas under pressure is stored, indicated in Fig. 5. Packing rings 77 and 78 prevent the passage of air or gas from or to the circumferential passage 76 but the net pressure of the gas within this circumferential passage 76 is exerted upon the packing ring carrier 79 and forces it toward the adjacent rotor rim 23, thus preventing leakage of burnt gases from the cylinder into the crank case. The packing ring carriers are positioned by the cylindrical flanges 81 which extend inwardly from the parts 5 and 5$^a$ of the casing. The pressure of the gases within this circumferential passage 76 also holds the packing rings 77 and 78 against the walls 6 and 6$^a$ of the casing. The surfaces of the packing ring carriers 79 and the adjacent rotors are lubricated by the oil which is thrown out by centrifugal force and so also are all the surfaces of the packing rings 77 and 78. A number of small passages 80 permit oil to flow from the body of the casing into the circumferential passage 82 between the packing ring carrier 79 and the flanges 81, and this oil, being thrown out by centrifugal force, presses the packing ring carriers toward each other and thereby prevents leakage from the cylinder. The rotor rims are pressed against the packing ring 33 by the packing ring carrier acting under the pressure in the passage 76. This pressure might be overcome by the tendency of the rotors to separate at high speeds, but this same high speed will cause a sufficient pressure of oil in the passage 82 to overcome this separating tendency. It will be noted that all these bearing surfaces are either cylindrical or planes at right angles to the axis of these cylinders.

The bearing 3 for the main shaft is shown held in position by a ring 85 that screws into the hub 9, being prevented from unscrewing by means of a threaded locking pin 86. The bearing 3$^a$ at the opposite end of the shaft is mounted on a two-part sleeve 87 secured to the shaft 4 by means of a key 88 and a nut 89, the shaft having a shoulder 90 against which the sleeve 87 is held. The bearing structure prevents the shaft from moving endwise therein.

The pipe 92 is provided to conduct lubricant to the casing and this may be drawn off through the pipe 93. The two engines are connected by the pipes 94 which permit free flow of the lubricant between them and also supply a settling basin where impurities may gather, these being drawn off as desired by means of the valve 95. The centrifugal force of the oil carried around by the rotors will give such pressure on the lubricant in each casing so that the quantity of lubricant in each will be kept substantially equal through the pipes 94, no matter at what angle the engines are carried.

The carbureter 96 may be of any desired construction and connects to the intake passages 67 by means of the pipes 97. The exhaust pipes 98 connect to the passages 68 and unite at the nozzle 99.

In Figs. 3 and 4 I have shown a number of short radial lines 101, evenly spaced to indicate the angular distances traveled by the main shaft and crank shaft carrier and a number of dots 102 which indicate the relative speeds of the centers of the pistons as these centers pass the points indicated by the dots. The pistons on one rotor are lettered 34 and 34ᵃ while those on the other rotor are lettered 34ᵇ and 34ᶜ. In Fig. 3, all the pistons are moving at about the same speed, the space between 34 and 34ᵇ being filled with uncompressed fuel and the space between 34ᵇ and 34ᵃ being filled with compressed fuel just being ignited by the spark plug 103. The speed of the piston 34ᵃ now increases while that of 34ᵇ is decreasing, thus providing for the expansion of the exploded fuel.

In Fig. 4, the positions of 34ᵇ and 34ᵃ indicate this relative movement, while the positions of 34ᵃ and 34ᶜ in Fig. 3 indicate the extent of this relative movement. Exhaust of the exploded fuel between 34ᶜ and 34ᵃ is just beginning while in Fig. 4 it is about half completed. In Fig. 3, the ports 104 and 105 provide for complete scavenging, while in Fig. 4, these ports are shown providing for the cooling of the piston 34ᶜ. The pipes 106 connect to the ports 105 and the circumferential space between the shell 106 and the nozzle 99 and cause a flow of air from the port 104 to the port 105 as fully explained in said Patent No. 1,348,675.

I claim:—

1. In an internal combustion engine, a casing including an annular cylinder, a main shaft mounted in the casing, a pair of rotors angularly movable about the main shaft, each of the rotors including a pair of pistons arranged to travel in the cylinder, the pistons of the two rotors alternating, hubs formed on the interior faces of the casing concentric with the shaft upon which the rotors are journaled independently of the shaft, and means to transmit stresses from the rotors to the shaft.

2. In an internal combustion engine, a casing including an annular cylinder, a main shaft mounted in the casing, a pair of rotors angularly movable about the main shaft, each of the rotors including a pair of pistons arranged to travel in the cylinder, the pistons of the two rotors alternating, a crank shaft carrier secured to said shaft, planetary crank shafts mounted in said carrier and connecting rods to connect each crank shaft to a rotor, and bearings for each rotor formed on the casing on both sides of said crank shaft carrier.

3. In an internal combustion engine, a casing including an annular cylinder, a main shaft mounted in the casing, a pair of rotors angularly movable about the main shaft, each of the rotors including a pair of pistons arranged to travel in the cylinder, the pistons of the two rotors alternating, each of said rotors embodying a main portion and a follower and posts connecting them, each of the main portions of the rotors being positioned between the portions of the other rotor and provided with slots through which the connecting posts of the other rotor extend, means connecting the rotors to the main shaft, and bearings formed on the casing to support the rotors independently of said main shaft.

4. In an internal combustion engine, a casing forming an annular cylinder, a main shaft journaled in the casing perpendicular to the plane of the circular axis of said cylinder at the center of the circle, a pair of rotors movable about the shaft and each including a pair of pistons arranged to travel in said cylinder, the pistons of the two pairs alternating, said casing embodying a pair of hub members in which the main shaft is journaled and a pair of flaring rings extending from said cylinder to said hub members.

5. In an internal combustion engine, a casing forming an annular cylinder and embodying hub members and flaring wings, a main shaft journaled in the casing perpendicular to the plane of the circular axis of said cylinder at the center of the circle, a pair of rotors movable about the shaft and each including a pair of pistons arranged to travel in said cylinder, the pistons of the two pairs alternating, said flaring rings and said hub portions having pairs of radial flanges, and screw threaded locking rings for forcing the flanges of each against each other.

6. In an internal combustion engine, a casing forming an annular cylinder, a main shaft journaled in the casing perpendicular to the plane of the circular axis of said cylinder at the center of the circle, a pair of rotors movable about the shaft and each including a pair of pistons arranged to travel in said cylinder, the pistons of the two pairs alternating, and bearing hubs formed on hub members within the casing on both sides of the plane of the axis of the cylinder whereon the rotors are mounted independently of the main shaft.

7. In an internal combustion engine, a casing forming an annular cylinder, a main shaft journaled in the casing perpendicular to the plane of the circular axis of said cylinder at the center of the circle, bearings for the main shaft mounted in the casing, a cylindrical flange extending inwardly from each side of the casing concentric with the shaft at each side of the plane of the axis of the cylinder, and a pair of two part rotors movable about the shaft and each including a pair of pistons arranged to travel in said cylinder, one of the parts of each rotor being journaled on each of said cylindrical flanges on the casing.

8. In an internal combustion engine, an annular cylinder and a casing connected thereto, a shaft journaled in the casing at right angles to the plane of the cylinder, a pair of rotors journaled in the casing concentric with the shaft and having rims adjacent the cylinder and forming parts of the wall thereof, pistons within the cylinder connected to the rotors, and a packing ring mounted in grooves in the adjacent faces of the rims of the rotors and also forming part of the wall of the cylinder.

9. In an internal combustion engine, an annular cylinder and a casing connected thereto, a shaft journaled in the casing at right angles to the plane of the cylinder, the cross section of the cylinder being generally circular excepting a straight portion parallel to the shaft, a pair of rotors journaled in the casing concentric with the shaft and having rims whose peripheries constitute parts of the straight portion of the wall of the cylinder, and a packing ring mounted in grooves in the adjacent faces of the rims of the rotors and also forming part of the straight portion of the wall of the cylinder.

10. In an internal combustion engine, a casing including an annular cylinder, a main shaft mounted in the casing, a pair of rotors movable about the main shaft, a crank shaft carrier mounted on the main shaft, planetary crank shafts mounted in said carrier, fly-wheels mounted on each crank shaft and having counterweighted portions to counterbalance the crank shafts, and connecting rods extending from the crank shafts to the rotors.

11. In an internal combustion engine, a casing including an annular cylinder, a main shaft mounted in the casing, a pair of rotors movable about the main shaft, a crank shaft carrier mounted on the main shaft, planetary crank shafts mounted in said carrier, fly-wheels mounted on each crank shaft and having counterweighted portions to counterbalance the crank shafts, and connecting rods extending from the crank shafts to the rotors, said crank shaft carrier consisting of parallel flanges having telescoping hubs secured together, the connecting rods and the fly-wheels being mounted on the crank shafts between said flanges.

12. In an internal combustion engine, a casing including an annular cylinder, a main shaft mounted in the casing, a pair of rotors movable about the main shaft, a crank shaft carrier mounted on the main shaft, planetary crank shafts mounted in said carrier, fly-wheels mounted on each crank shaft and having counterweighted portions to counterbalance the crank shafts, connecting rods extending from the crank shafts to the rotors, said crank shaft carrier consisting of parallel flanges having telescoping hubs secured together, the connecting rods and the fly-wheels being mounted on the crank shafts between said flanges, an abutment gear mounted on the casing, and a pinion on each crank shaft on the outer side of one of said flanges and meshing with said gear.

13. In a gas engine, a casing including an annular cylinder, a main shaft mounted in the casing, a pair of rotors movable about the main shaft, a crank shaft carrier mounted on the main shaft, planetary crank shafts mounted in said carrier, means to counterbalance the crank shafts, and means connecting the crank shafts to the rotors.

14. In a gas engine, a casing including an annular cylinder, a main shaft mounted in the casing, a pair of rotors movable about the main shaft, a crank shaft carrier mounted on the main shaft, planetary crank shafts mounted in said carrier, means to counterbalance the crank shafts, means connecting the crank shafts to the rotors, and means mounted on the crank shafts to prevent back-lash of the pinions.

15. In a gas engine, a casing including an annular cylinder, a main shaft mounted in the casing, a pair of rotors movable about the main shaft, a crank shaft carrier mounted on the main shaft, planetary crank shafts mounted in the carrier, an abutment gear on the casing, pinions on the crank shafts in mesh with the gear, and means to prevent back-lash of the pinions.

16. In a gas engine, a casing including an annular cylinder, a main shaft mounted in the casing, a pair of rotors movable about the main shaft, a crank shaft carrier mounted on the main shaft, planetary crank shafts mounted in the carrier, an abutment gear on the casing, pinions on the crank shafts in mesh with the gear, and means connected to the individual crank shafts for storing intermittent energy and transmitting the same to the main shaft at a substantially constant rate.

17. In an internal combustion engine, an annular cylinder and a casing connected thereto and containing lubricating oil, a main shaft journaled in the casing at right angles to the plane of the cylinder, a pair of rotors journaled in the casing concentric with the main shaft and having rims adjacent the cylinder, the peripheries of the rotors forming a part of the cylinder wall, pistons connected to the rims of the rotors, a pair of cylindrical flanges within the casing, and bearing rings mounted thereon to engage the rotor rims, circumferential passages being formed by the bearing rings and said flanges being formed with openings through which oil may be forced into said passages by centrifugal force to press the bearing rings against the rotor rims.

18. In an internal combustion engine, an annular cylinder and a casing connected thereto and containing lubricating oil, a main shaft journaled in the casing at right angles to the plane of the cylinder, a pair of rotors journaled in the casing concentric with the main shaft and having rims adjacent the cylinder, the peripheries of the rotors forming a part of the cylinder wall, pistons connected to the rims of the rotors, a pair of cylindrical flanges within the casing, and bearing rings mounted thereon to engage the rotor rims, circumferential passages being formed by the bearing rings and said flanges, said flanges being formed with openings through which oil may be forced into said passages by centrifugal force to press the bearing rings against the rotor rims, said bearing rings being formed with circumferential grooves, and said casing being formed with passages to conduct fuel under pressure to said grooves to assist the pressure of the oil to hold the bearing rings against the rotor rims.

19. In an internal combustion engine, a casing including an annular cylinder, a main shaft mounted in the casing, a pair of rotors movable about the main shaft, pistons within the cylinder and connected to the rotors and adapted to intermittently transmit force to the rotors, a crank shaft carrier mounted on the main shaft, planetary crank shafts rotatably mounted in the carrier, connecting rods between the crank shafts and the rotors, and means connected to the crank shafts for storing intermittent energy from the pistons and transmitting it to the rotors to cause them to move smoothly in one direction at variable speeds.

20. In an internal combustion engine, a casing including an annular cylinder, a separate main frame, a separate hub structure opposite the main frame and in alinement therewith, and annular flaring portions extending from the annular cylinder to the main frame at one side and to the hub structure at the other side, said flaring portions and the main frame and the hub structure being formed with engaging radial flanges, and means adapted to lock the flanges of the flaring portions to the corresponding flanges on the frame and on the hub structure, the flanges on the two sides of the flaring portions being similar in size and shape so that the flaring portions and the cylinders may be reversed on the main frame.

21. In an internal combustion engine, a casing including an annular cylinder, a separate main frame provided with a hub concentric with the cylinder, a main shaft extending through the main frame, a hub structure connected to the casing and a bearing therein for said shaft, rotors mounted on the main frame and separated from the main shaft, a crank shaft carrier mounted on the main shaft and planetary crank shafts rotatable therein, means connecting the crank shafts and the rotors, and means connected to the crank shafts and to the main frame to transmit thereto all twisting stresses from the crank shafts without stressing the cylinders.

22. In an internal combustion engine, a casing including an annular cylinder, a separate main frame provided with a hub concentric with the cylinder, a main shaft extending through the main frame, a hub structure connected to the casing and a bearing therein for said shaft, rotors mounted on the main frame and separated from the main shaft, a crank shaft carrier mounted on the main shaft and planetary crank shafts rotatable therein, means connecting the crank shafts and the rotors, and means connected to the crank shafts and to the main frame to transmit thereto all twisting stresses from the crank shafts without stressing the cylinders, said means embodying an abutment gear secured to the main frame concentric with the main shaft and a pinion on each crank shaft in mesh with said gear.

23. In an internal combustion engine, a casing including an annular cylinder, a separate main frame provided with a hub concentric with the cylinder, a main shaft extending through the main frame, a hub structure connected to the casing and a bearing therein for said shaft, rotors mounted on the main frame and separated from the main shaft, a crank shaft carrier mounted on the main shaft and planetary crank shafts rotatable therein, means connecting the crank shafts and the rotors, and means connected to the crank shafts and to the main frame to transmit thereto all twisting stresses from the crank shafts without stressing the cylinders, said crank shafts being in two pairs, one pair for each rotor and the crank shafts of each pair being diametrically opposite each other so as to balance the twisting stresses.

24. In an internal combustion engine, the combination of a casing and an annular cylinder connected thereto, a pair of relatively movable rotors within the casing, pistons connected to the rotors, a main shaft, and means to transmit forces from the rotors to the main shaft, said rotors comprising main portions and followers, the main portions having circular slots, the parts of each rotor being connected together by posts which extend through the slots in the other rotor.

25. In an internal combustion engine, the combination of a casing and a pair of rotors mounted therein, each consisting of a main portion and a follower, the main portion of each rotor being positioned between the main portion and the follower of the other rotor and being provided with circular slots, and posts extending between the main portion and follower of each rotor through the slots in the other rotor.

26. In an internal combustion engine, a main shaft and means to rotate the shaft, a casing and a ball bearing for the shaft, a two part sleeve within the bearing and having flanges at its ends, and which is secured in the casing, said shaft having a shoulder, and a nut to hold the sleeve against the shoulder.

27. In an internal combustion engine, a pair of casings and a main supporting frame between them, operating mechanism including a main shaft mounted in the casings, an oil conduit between the casings, and means to drain the conduit.

28. In an internal combustion engine, a pair of casings and a main supporting frame between them, operating mechanism including a main shaft mounted on the casings, an oil conduit between the casings, and means to drain the conduit, said conduit constituting a settling basin when the engine is in normal position with its main shaft horizontal.

29. In an internal combustion engine, a casing including an annular cylinder, a main shaft mounted in the casing, a pair of rotors movable about the main shaft, a crank shaft carrier mounted on the main shaft and comprising two parallel flanges, planetary crank shafts mounted in the carrier, means connecting the crank shafts to the rotors, and counterbalancing fly-wheels mounted on the crank shafts.

30. In an internal combustion engine, a casing including an annular cylinder, a main shaft mounted in the casing, a pair of rotors angularly movable about the main shaft, each of the rotors including a pair of pistons arranged to travel in the cylinder, the pistons of the two rotors alternating, hubs formed on the interior faces of the casing concentric with the shaft, bearing rings mounted on said hubs and upon which said rotors are journaled independently of the main shaft, and means to transmit stresses from the rotors to the main shaft.

31. In an internal combustion engine, a casing including an annular cylinder, a main shaft mounted in the casing, a pair of rotors angularly movable about the main shaft, each of the rotors including a pair of pistons arranged to travel in the cylinder, the pistons of the two rotors alternating, hubs formed on the interior faces of the casing concentric with the shaft, bearing rings mounted on said hubs and upon which said rotors are journaled independently of the main shaft, said rings being formed with circumferential grooves, spring rings mounted in said grooves between the journals of the rotors, and means to transmit stresses from the rotors to the main shaft.

32. In an internal combustion engine, a casing including an annular cylinder, a main shaft mounted in the casing, a pair of rotors movable about the main shaft, pistons within the cylinder and connected to the rotors and adapted to intermittently transmit force to the rotors, a crank shaft carrier mounted on the main shaft, planetary crank shafts rotatably mounted in the carrier, connecting rods between the crank shafts and the rotors, and fly-wheels connected to the crank shafts for storing intermittent energy from the pistons and transmitting it to the rotors to cause them to move smoothly in one direction at variable speeds.

HOWARD L. WEED.